United States Patent
Yamasaki (10) Patent No.: US 10,277,758 B2
(45) Date of Patent: Apr. 30, 2019

(54) IMAGE READING DEVICE CAPABLE OF LOCKING MOVEMENT OF CARRIAGE, IMAGE FORMING APPARATUS, LOCKING MEMBER

(71) Applicant: KYOCERA Document Solutions Inc., Osaka-shi, Osaka (JP)

(72) Inventor: Shunsuke Yamasaki, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/897,087

(22) Filed: Feb. 14, 2018

(65) Prior Publication Data
US 2018/0241895 A1    Aug. 23, 2018

(30) Foreign Application Priority Data
Feb. 22, 2017    (JP) .................................. 2017-030785

(51) Int. Cl.
*H04N 1/00*    (2006.01)
*H04N 1/193*    (2006.01)
*H04N 1/10*    (2006.01)
*H04N 1/12*    (2006.01)

(52) U.S. Cl.
CPC ..... *H04N 1/00538* (2013.01); *H04N 1/00559* (2013.01); *H04N 1/00602* (2013.01); *H04N 1/1043* (2013.01); *H04N 1/1056* (2013.01); *H04N 1/1225* (2013.01); *H04N 1/193* (2013.01); *H04N 2201/0094* (2013.01)

(58) Field of Classification Search
CPC ........... H04N 1/00538; H04N 1/00559; H04N 1/00602; H04N 1/1043; H04N 1/1056; H04N 1/1225; H04N 1/193; H04N 1/0094

USPC ........................................................ 358/474
See application file for complete search history.

(56) References Cited

U.S. PATENT DOCUMENTS

| | | | | |
|---|---|---|---|---|
| 4,542,414 A * | 9/1985 | Nagane | .............. | H04N 1/00519 271/272 |
| 5,754,314 A * | 5/1998 | Araki | ................. | H04N 1/00795 348/96 |
| 2015/0296093 A1* | 10/2015 | Yamamoto | ........... | G03G 15/605 358/474 |
| 2017/0022018 A1* | 1/2017 | Koda | ................... | B65H 3/0669 |

FOREIGN PATENT DOCUMENTS

JP    2011070113 A    4/2011

* cited by examiner

*Primary Examiner* — Allen H Nguyen
(74) *Attorney, Agent, or Firm* — Alleman Hall Creasman & Tuttle LLP (57) ABSTRACT

An image reading device includes a housing, a carriage, and a lock mechanism. The housing includes an exterior member and a document sheet placement surface. The carriage is configured to move in the housing along a predetermined specific direction. The lock mechanism is configured to lock the carriage to a lock position. The lock mechanism includes a supported portion and a locking portion. The supported portion is supported by the housing and provided between the exterior member and the carriage disposed at the lock position. The locking portion moves between a first position and a second position in response to a magnetic force of a magnet disposed at a specific position on the exterior member so as to, at the first position, engage the supported portion with the carriage disposed at the lock position, and at the second position, release engagement between the supported portion and the carriage.

11 Claims, 7 Drawing Sheets

IMAGE READING DEVICE CAPABLE OF LOCKING MOVEMENT OF CARRIAGE, IMAGE FORMING APPARATUS, LOCKING MEMBER

INCORPORATION BY REFERENCE

This application is based upon and claims the benefit of priority from the corresponding Japanese Patent Application No. 2017-030785 filed on Feb. 22, 2017, the entire contents of which are incorporated herein by reference.

BACKGROUND

The present disclosure relates to an image reading device configured to read an image from a document sheet, an image forming apparatus including an image reading device, and a locking member.

In an image reading device such as a scanner, image data is read from a document sheet placed on a document sheet placement surface such as a contact glass. For example, this type of image reading device includes a housing and a carriage, wherein the housing has the document sheet placement surface. The carriage is configured to move in the housing along a sub scanning direction. A light source and a mirror are attached to the carriage, wherein the light source emits light toward the document sheet placed on the document sheet placement surface, and the mirror guides the light reflected on the document sheet to a light receiving element such as a CCD.

Meanwhile, in the image reading device, the carriage may be moved in the housing by swings, vibrations or the like generated during transportation of the image reading device. In that case, if, for example, the carriage moves with vigor toward an end portion of the housing, the attachment position of the light source or the like in the carriage may be shifted due to an impact generated when the carriage reaches the end portion. As a related technology addressing this problem, there is known an image reading device that is provided with a lock portion configured to lock the movement of the carriage in the housing.

SUMMARY

An image reading device according to an aspect of the present disclosure includes a housing, a carriage, and a lock mechanism. The housing includes an exterior member and a document sheet placement surface on which a document sheet is placed, the exterior member forming an outer surface of the image reading device. The carriage is configured to move in the housing along a predetermined specific direction. Either or both of a light source and a mirror that are used to read an image from the document sheet placed on the document sheet placement surface, are attached to the carriage. The lock mechanism is configured to lock the carriage to a predetermined lock position within a movement range of the carriage. The lock mechanism includes a supported portion and a locking portion. The supported portion is supported by the housing and provided between the exterior member and the carriage disposed at the lock position. The locking portion moves from either of a first position and a second position to the other in response to a magnetic force of a magnet that is disposed at a specific position on the exterior member in a state of facing the supported portion across the exterior member, so as to, at the first position, engage the supported portion with the carriage disposed at the lock position, and at the second position, release engagement between the supported portion and the carriage, the second position being closer to the exterior member than the first position.

An image forming apparatus according to another aspect of the present disclosure includes the image reading device and an image forming portion. The image forming portion is configured to form an image based on image data read by the image reading device.

A locking member according to a further aspect of the present disclosure is provided in an image reading device that includes: a housing including an exterior member and a document sheet placement surface on which a document sheet is placed, the exterior member forming an outer surface of the image reading device; a carriage configured to move in the housing along a predetermined specific direction, wherein either or both of a light source and a mirror that are used to read an image from the document sheet placed on the document sheet placement surface, are attached to the carriage; and a supported portion supported by the housing and provided between the exterior member and the carriage disposed at a predetermined lock position within a movement range of the carriage. The locking member moves from either of a first position and a second position to the other in response to a magnetic force of a magnet that is disposed at a specific position on the exterior member in a state of facing the supported portion across the exterior member, so as to, at the first position, engage the supported portion with the carriage disposed at the lock position, and at the second position, release engagement between the supported portion and the carriage, the second position being closer to the exterior member than the first position.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes embodiments of the present disclosure with reference to the accompanying drawings for the understanding of the present disclosure. It should be noted that the following embodiments are examples of specific embodiments of the present disclosure and should not limit the technical scope of the present disclosure.

First Embodiment

Figure 1:
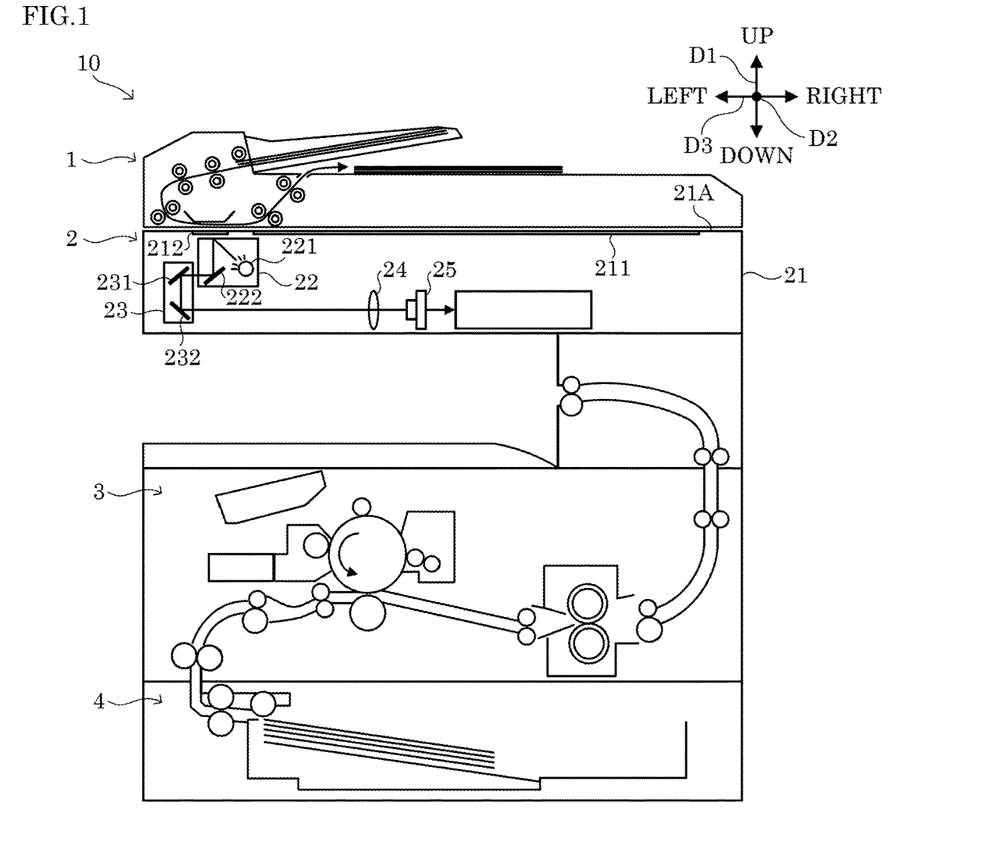
FIG. 1 is a diagram showing a configuration of an image forming apparatus according to a first embodiment of the present disclosure.
Figure 2:
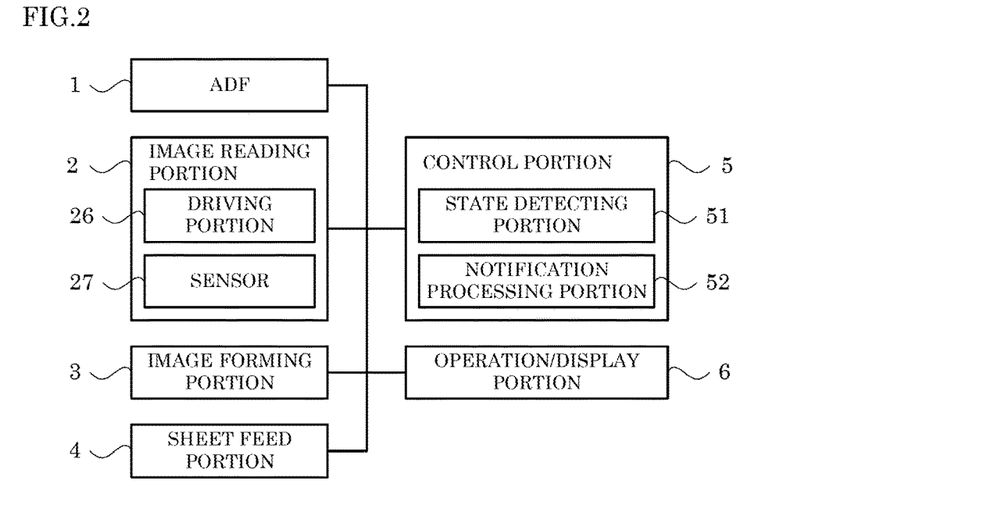
FIG. 2 is a block diagram showing a system configuration of the image forming apparatus according to the first embodiment of the present disclosure.

First, a description is given of a configuration of an image forming apparatus 10 according to a first embodiment of the present disclosure with reference to FIG. 1 and FIG. 2. Here, FIG. 1 is a schematic cross-sectional diagram showing the configuration of the image forming apparatus 10.

It is noted that for the sake of explanation, a vertical direction in a state where the image forming apparatus 10 is installed in a usable manner (the state shown in FIG. 1) is defined as an up-down direction D1. In addition, a front-rear direction D2 is defined on the supposition that a front side of the image forming apparatus 10 in FIG. 1 is the front (front side). In addition, a left-right direction D3 is defined based on the front side of the image forming apparatus 10 in the installed state.

The image forming apparatus 10 is a multifunction peripheral having a plurality of functions such as: a scan function for reading image data from a document sheet; a print function for forming an image based on the image data; a facsimile function; and a copy function. It is noted that the present disclosure is applicable to image forming apparatuses and image reading devices such as a scanner device, a facsimile device, and a copier.

As shown in FIG. 1 and FIG. 2, the image forming apparatus 10 includes an ADF 1, an image reading portion 2, an image forming portion 3, a sheet feed portion 4, a control portion 5, and an operation/display portion 6. Here, a device including the image reading portion 2 and the control portion 5 is an example of the image reading device according to the present disclosure.

The ADF 1 includes a document sheet setting portion, a plurality of conveyance rollers, a document sheet pressing, and a sheet discharge portion, and is an automatic document sheet feeder for conveying a document sheet so that it is read by the image reading portion 2.

The image forming portion 3 is configured to form an image by an electrophotographic system based on image data read by the image reading portion 2. In addition, the image forming portion 3 can form an image based on image data input from an external information processing apparatus such as a personal computer. Specifically, the image forming portion 3 includes a photoconductor drum, a charging device, a laser scanning unit (LSU), a developing device, a transfer roller, a cleaning device, a fixing roller, a pressure roller, and a sheet discharge tray.

The sheet feed portion 4 supplies a sheet to the image forming portion 3. The image forming portion 3 forms an image on the sheet supplied from the sheet feed portion 4, and the sheet with the image formed thereon is discharged to the discharge tray. It is noted that the sheet supplied from the sheet feed portion 4 is a sheet-like material such as a sheet of paper, a sheet of coated paper, a postcard, an envelope, or an OHP sheet.

The control portion 5 includes control equipment such as CPU, ROM, and RAM that are not shown. The CPU is a processor that executes various calculation processes. The ROM is a nonvolatile storage device in which various information such as control programs for causing the CPU to execute various processes are stored in advance. The RAM is a volatile storage device that is used as a temporary storage memory (working area) for the various processes executed by the CPU. In the control portion 5, the CPU executes the various control programs stored in advance in the ROM. This allows the image forming apparatus 10 to be comprehensively controlled by the control portion 5. It is noted that the control portion 5 may be constituted from an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information based on control instructions from the control portion 5. The operation portion is composed of, for example, operation keys or a touch panel through which various types of information are input to the control portion 5 based on user operations.

The image reading portion 2 is configured to read image data from a document sheet conveyed by the ADF 1, or from a document sheet placed on a first contact glass 211 (see FIG. 1). As shown in FIG. 1 and FIG. 2, the image reading portion 2 includes a housing 21, a first carriage 22, a second carriage 23, an optical lens 24, a CCD 25, a driving portion 26, and a sensor 27.

The housing 21 stores the components of the image reading portion 2. The first carriage 22, the second carriage 23, the optical lens 24, the CCD 25, the driving portion 26, and the sensor 27 are stored in the housing 21.

As shown in FIG. 1, the housing 21 includes a first contact glass 211 and a second contact glass 212. The first contact glass 211 and the second contact glass 212 are provided in an upper portion of the housing 21, and form a part of an upper surface 21A of the housing 21 (see FIG. 1). On the first contact glass 211, a document sheet is placed so that an image is read therefrom by the image reading portion 2. An upper surface of the first contact glass 211 is a document sheet placement surface on which a document sheet is placed in the image forming apparatus 10. The second contact glass 212 is used to read an image from a document sheet conveyed by the ADF 1.

The ADF 1 is provided on the upper surface 21A of the housing 21. The ADF 1 is supported at a rear end portion of the upper surface 21A so as to be opened and closed with respect to the upper surface 21A, and serves as a document sheet cover with respect to a document sheet placed on the first contact glass 211. In a state where the ADF 1 is closed with respect to the upper surface 21A, the second contact glass 212 forms a part of a conveyance path of a document sheet conveyed by the ADF 1. In the image reading portion 2, when the ADF 1 is closed with respect to the upper surface 21A, it is possible to read image data from a document sheet conveyed by the ADF 1.

As shown in FIG. 1, the first carriage 22 is provided below the first contact glass 211 and the second contact glass 212. The first carriage 22 is elongated in the front-rear direction D2, and configured to move in the left-right direction D3 upon receiving a driving force supplied from the driving portion 26. As shown in FIG. 1, a light source 221 and a mirror 222 are attached to the first carriage 22. The light source 221 and the mirror 222 are used to read an image from a document sheet placed on the first contact glass 211. Here, the first carriage 22 is an example of the carriage of the present disclosure. In addition, the left-right direction D3 is an example of the specific direction of the present disclosure.

The light source 221 includes a lot of white LEDs that are arranged along the front-rear direction D2 perpendicular to the left-right direction D3 in which the first carriage 22 moves. The light source 221 emits one line of light toward the first contact glass 211 or the second contact glass 212, wherein the one line of light extends along the front-rear direction D2. The light emitted from the light source 221 is reflected on a document sheet placed on the first contact glass 211 or conveyed by the ADF 1, and the reflected light is reflected by the mirror 222 toward a mirror 231 of the second carriage 23.

As shown in FIG. 1, the second carriage 23 is provided below the first contact glass 211 and the second contact glass 212. The second carriage 23 is elongated in the front-rear direction D2, and configured to move in the left-right direction D3, namely, in the same direction as the first carriage 22, in conjunction with the movement of the first carriage 22. In addition, the second carriage 23 moves at a half speed of the first carriage 22. As shown in FIG. 1, the mirror 231 and a mirror 232 are attached to the second carriage 23.

The mirror 231 reflects light incident from the mirror 222 of the first carriage 22, toward the mirror 232. The mirror 232 reflects the light incident from the mirror 231 toward the optical lens 24.

The optical lens 24 condenses light incident from the mirror 232 of the second carriage 23, and makes the condensed light incident to the CCD 25.

The CCD 25 is an image sensor including a photoelectric conversion element that receives light incident from the optical lens 24, and outputs an electric signal corresponding to an amount of the received light. The electric signal output from the CCD 25 is converted to a digital signal by an analog front end circuit (not shown), and the digital signal is input to the control portion 5, wherein the digital signal represents the image data.

Upon supply of electric current, the driving portion 26 supplies driving forces for moving the first carriage 22 and the second carriage 23, to the first carriage 22 and the second carriage 23. For example, the driving portion 26 is a stepping motor. By the driving force supplied from the driving portion 26, the first carriage 22 is moved in a range from a start position P1 (see FIG. 5) to an end position P2 (see FIG. 5) in the housing 21. It is noted that in the present embodiment, a position of a right end portion of the first carriage 22 is regarded as a position of the first carriage 22 in the housing 21 (see FIG. 5).

The sensor 27 is configured to detect whether or not the first carriage 22 is at the start position P1 (see FIG. 5) in the housing 21. For example, the sensor 27 is a reflection-type or transmission-type optical sensor. The sensor 27 outputs an electric signal to the control portion 5, wherein the electric signal indicates whether or not the first carriage 22 is detected at the start position P1.

Figure 5:
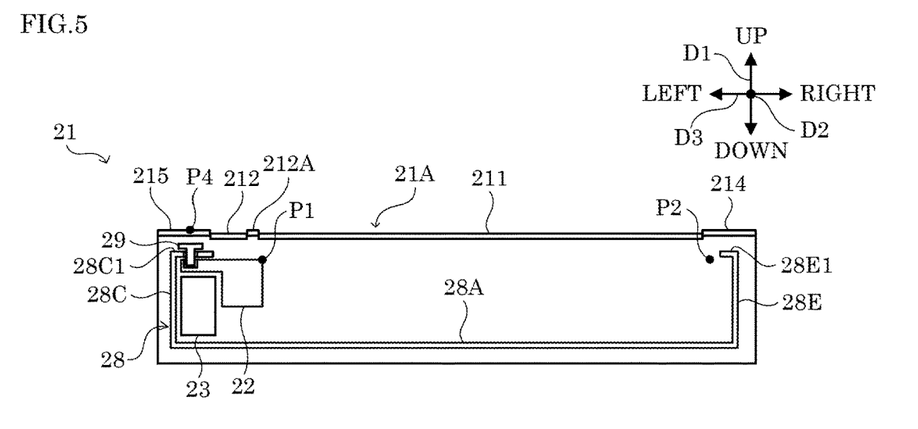
FIG. 5 is a diagram showing a movement range of a first carriage in the image forming apparatus according to the first embodiment of the present disclosure.

In the image reading portion 2, in a case where image data is read from a document sheet placed on the first contact glass 211, the first carriage 22 is moved from the start position P1 (see FIG. 5) to the end position P2 (see FIG. 5). This allows the one line of light emitted from the light source 221 that extends along the front-rear direction D2, to move along the left-right direction D3 such that the surface of the document sheet is scanned. That is, the front-rear direction D2 is a main scanning direction when the image reading portion 2 reads image data from a document sheet placed on the first contact glass 211. In addition, the left-right direction D3 is a sub scanning direction when the image reading portion 2 reads image data from a document sheet placed on the first contact glass 211.

In addition, the second carriage 23 moves in conjunction with the movement of the first carriage 22 from the start position P1 to the end position P2, in a direction from the start position P1 toward the end position P2 at a half speed of the first carriage 22. With this configuration, the light path length from the light source 221 to the CCD 25 is maintained at a predetermined value while the first carriage 22 moves from the start position P1 to the end position P2.

When reading of image data from a document sheet placed on the first contact glass 211 is completed, the first carriage 22 is returned to the start position P1. The start position P1 is a so-called home position of the first carriage 22. Specifically, the control portion 5 causes the driving portion 26 to drive the first carriage 22 to move from the end position P2 toward the start position P1 until the sensor 27 outputs an electric signal indicating a detection of the first carriage 22. It is noted that the second carriage 23 moves in conjunction with the movement of the first carriage 22, in the same direction as the first carriage 22 at a half speed of the first carriage 22.

In addition, in the image reading portion 2, in a case where image data is read from a document sheet conveyed by the ADF 1, the first carriage 22 is fixedly disposed at the start position P1 (see FIG. 5). The light source 221 of the first carriage 22 disposed at the start position P1 emits one line of light extending in the front-rear direction D2, toward the conveyance path of the document sheet conveyed by the ADF 1. With this configuration, the document sheet conveyed by the ADF 1 passes a position in the conveyance path that receives light emitted from the light source 221, thereby the surface of the document sheet is scanned.

Meanwhile, in the image forming apparatus 10, the first carriage 22 and the second carriage 23 may be moved in the housing 21 by swings, vibrations or the like generated during transportation of the image forming apparatus 10. In that case, if, for example, the first carriage 22 moves with vigor toward the start position P1 (see FIG. 5) or the end position P2 (see FIG. 5) in the housing 21, the attachment positions of the light source 221 or the like in the first carriage 22 and the second carriage 23 may be shifted due to an impact generated when the first carriage 22 reaches the start position P1 or the end position P2. As a related technology addressing this problem, there is known an image reading device that is provided with a lock portion configured to lock the movement of the first carriage 22 in the housing 21.

However, according to the above-mentioned related technology, an operation portion for switching between a locked state and an unlocked state of the lock portion is provided on an exterior member that constitutes an outer surface of the image reading device. This makes the configuration of the exterior member complicated. On the other hand, as described in the following, in the image forming apparatus 10 according to the embodiments of the present disclosure, the configuration of the exterior member can be made simple.

Figure 3:
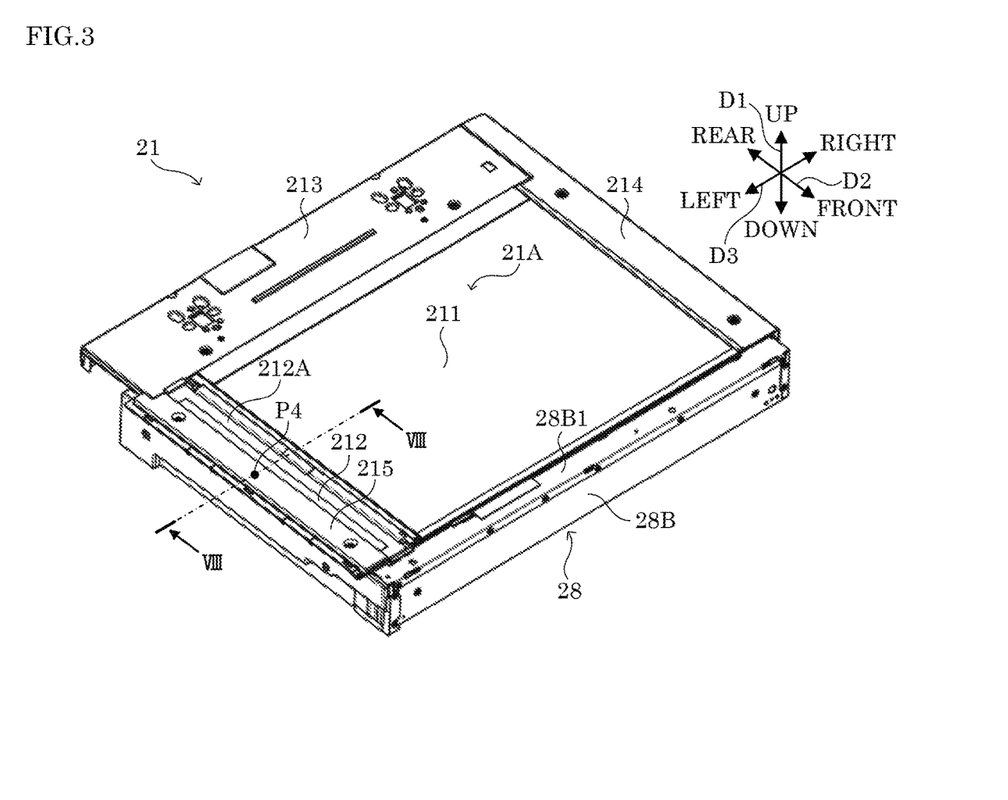
FIG. 3 is a diagram showing a configuration of a housing and a frame in the image forming apparatus according to the first embodiment of the present disclosure.
Figure 4:
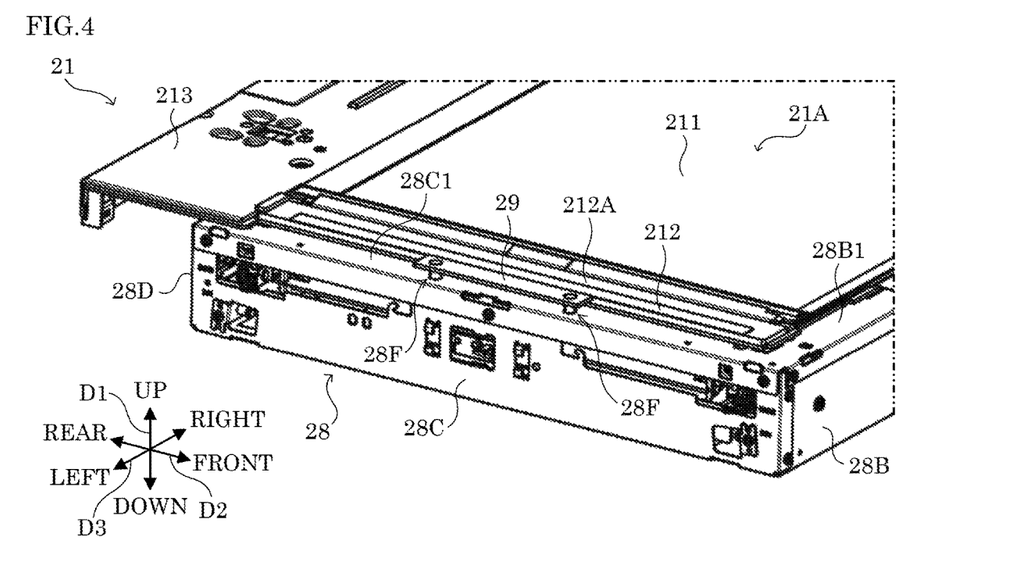
FIG. 4 is a diagram showing a configuration of the housing and the frame in the image forming apparatus according to the first embodiment of the present disclosure.
Figure 6:
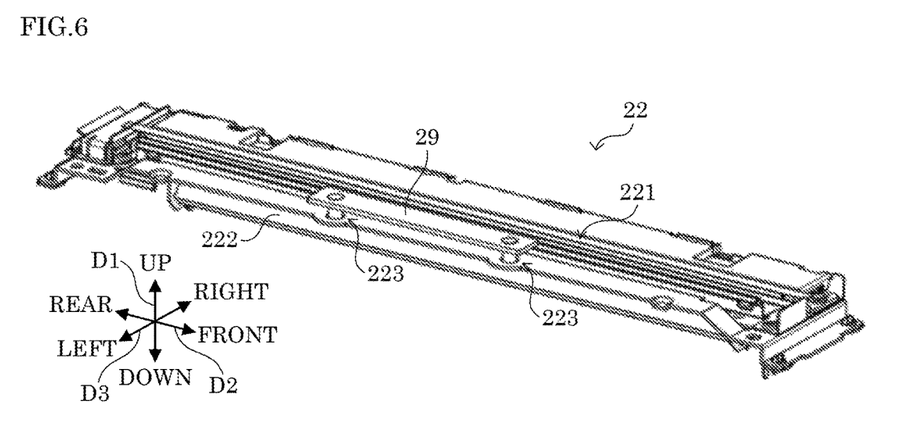
FIG. 6 is a diagram showing a configuration of the first carriage in the image forming apparatus according to the first embodiment of the present disclosure.
Figure 7:
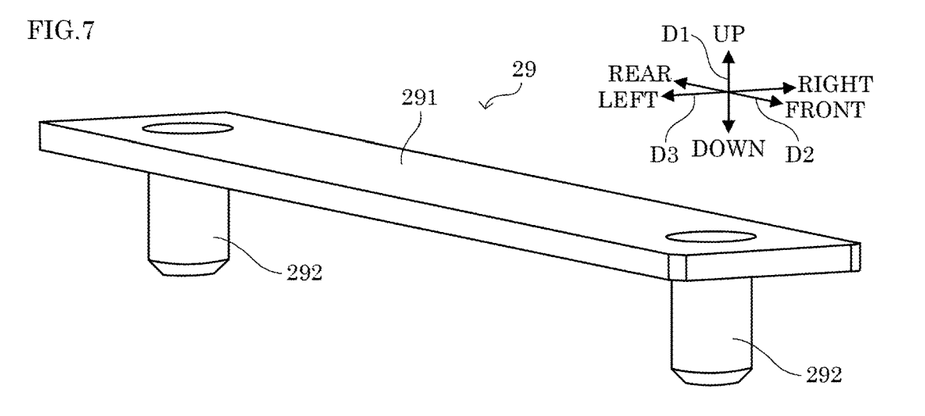
FIG. 7 is a diagram showing a configuration of a locking portion in the image forming apparatus according to the first embodiment of the present disclosure.
Figure 8:
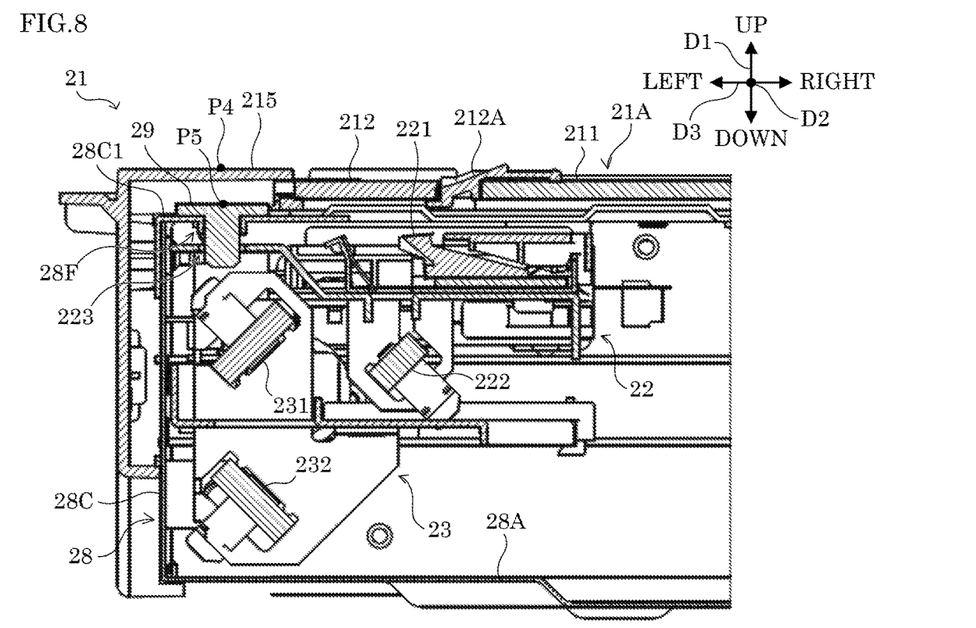
FIG. 8 is a diagram showing a first position of the locking portion in the image forming apparatus according to the first embodiment of the present disclosure.
Figure 9:
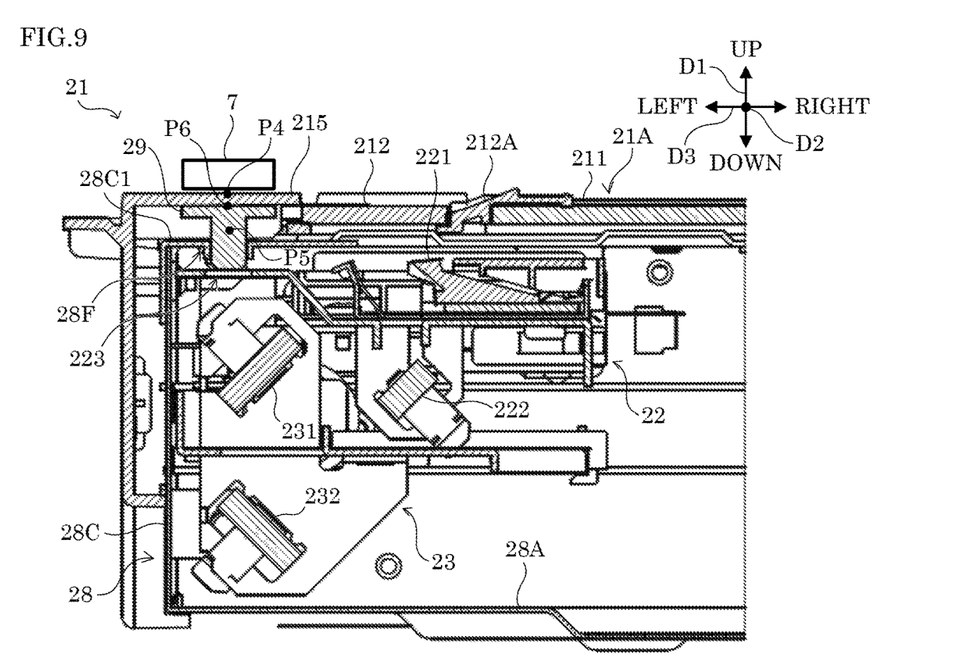
FIG. 9 is a diagram showing a second position of the locking portion in the image forming apparatus according to the first embodiment of the present disclosure.

In the following, the image reading portion 2 is described in detail with reference to FIG. 3 to FIG. 9. Here, FIG. 3 is a perspective diagram showing a configuration of exterior members 213 to 215 of the housing 21, and a frame 28. FIG. 4 is a perspective diagram showing a configuration of the frame 28 and a locking portion 29. FIG. 5 is a schematic cross-sectional diagram showing a configuration of an interior of the housing 21. FIG. 6 is a perspective diagram showing a configuration of the first carriage 22. FIG. 7 is a perspective diagram showing a configuration of the locking portion 29. FIG. 8 is a cross-sectional diagram taken along the VIII-VIII line and viewed from the direction of arrows shown in FIG. 3, and shows a state where the locking portion 29 is disposed at a first position P5. FIG. 9 is a diagram showing a state where the locking portion 29 is disposed at a second position P6 in the cross-sectional diagram of FIG. 8.

As shown in FIG. 3, the housing 21 includes the exterior members 213 to 215 and a support member 212A.

The exterior members 213 to 215 form a part of the upper surface 21A of the housing 21. For example, the exterior members 213 to 215 are formed from resin.

As shown in FIG. 3, the exterior member 213 is elongated in the left-right direction D3, and forms a part of the upper surface 21A at a rear portion of the first contact glass 211 and the second contact glass 212. In addition, as shown in FIG. 3, the exterior member 214 is elongated in the front-rear direction D2, and forms a part of the upper surface 21A at a right portion of the first contact glass 211. Furthermore, as shown in FIG. 3, the exterior member 215 is elongated in the front-rear direction D2, and forms a part of the upper surface 21A at a left portion of the first contact glass 211. It is noted that the housing 21 includes: an exterior member (not shown) that forms a part of the upper surface 21A at a front portion of the first contact glass 211 and the second contact glass 212; an exterior member (not shown) that forms a part of the upper surface 21A at a left portion of the exterior member 215; and exterior members (not shown) that form a bottom surface and side surfaces of the housing 21.

The support member 212A supports the second contact glass 212. The support member 212A forms a part of the upper surface 21A of the housing 21. For example, the support member 212A is formed from resin.

As shown in FIG. 3 and FIG. 4, the image reading portion 2 includes the frame 28 and the locking portion 29.

The frame 28 is fixed to the housing 21 in the interior of the housing 21. For example, the frame 28 is formed from a sheet metal.

The frame 28 supports the first carriage 22 and the second carriage 23 such that they can move in the left-right direction D3. The first carriage 22 movably supported by the frame 28 moves in a range from the start position P1 to the end position P2 shown in FIG. 5. For example, the start position P1 is a left end portion of the movable range of the first carriage 22. In addition, the end position P2 is a right end portion of the movable range of the first carriage 22.

As shown in FIG. 3 to FIG. 5, the frame 28 includes a bottom plate portion 28A and side wall portions 28B to 28E. The bottom plate portion 28A is formed in the shape of a rectangle. The side wall portion 28B is formed to stand upright along a front edge portion of the bottom plate portion 28A. At an upper portion of the side wall portion 28B, a bent portion 28B1 (see FIG. 3) bent toward the interior of the bottom plate portion 28A is formed. The side wall portion 28C is formed to stand upright along a left edge portion of the bottom plate portion 28A. At an upper portion of the side wall portion 28C, a bent portion 28C1 (see FIG. 4) bent toward the interior of the bottom plate portion 28A is formed. The side wall portion 28D is formed to stand upright along a rear edge portion of the bottom plate portion 28A. At an upper portion of the side wall portion 28D, a bent portion (not shown) bent toward the interior of the bottom plate portion 28A is formed. The side wall portion 28E is formed to stand upright along a right edge portion of the bottom plate portion 28A. At an upper portion of the side wall portion 28E, a bent portion 28E1 (see FIG. 5) bent toward the interior of the bottom plate portion 28A is formed.

Here, as shown in FIG. 5, the bent portion 28C1 is provided between the first carriage 22 disposed at the start position P1 and the exterior member 215. A left end portion of the first carriage 22 disposed at the start position P1 is covered with the bent portion 28C1. The bent portion 28C1 and the exterior member 215 are separated from each other by a predetermined distance. Here, the bent portion 28C1 is an example of the supported portion of the present disclosure.

The locking portion 29 is configured to move between the first position P5 and the second position P6 that is closer to the exterior member 215 than the first position P5, wherein the locking portion 29 at the first position P5 engages the bent portion 28C1 with the first carriage 22 disposed at the start position P1 (see FIG. 8), and the locking portion 29 at the second position P6 releases the engagement between the bent portion 28C1 and the first carriage 22 (see FIG. 9). Here, as shown in FIG. 8 and FIG. 9, the second position P6 is separated from the first position P5 in an upward direction.

Specifically, the locking portion 29 is moved from the first position P5 to the second position P6 by the magnetic force of a magnet 7 disposed at a specific position P4 (see FIG. 5) on the exterior member 215 in a state of facing the bent portion 28C1 across the exterior member 215. For example, the specific position P4 is a position where a plane intersects the upper surface of the exterior member 215, wherein the plane includes a central portion of the first carriage 22 in the front-rear direction D2, and is perpendicular to the front-rear direction D2. In addition, the first position P5 and the second position P6 are positioned below the specific position P4.

Here, the locking portion 29 is an example of the locking member of the present disclosure.

More specifically, the locking portion 29 is moved from the first position P5 to the second position P6 by being magnetically attracted to the magnet 7. For example, the locking portion 29 is formed from a ferromagnetic body such as iron. It is noted that the locking portion 29 may include a magnet.

As shown in FIG. 7, the locking portion 29 includes a base portion 291 and projection portions 292. The base portion 291 is formed in the shape of a flat plate that is elongated in the front-rear direction D2 that is equal to the longitudinal direction of the first carriage 22. For example, the base portion 291 is disposed such that its central portion in the longitudinal direction is positioned below the specific position P4 in a gap formed between the bent portion 28C1 and the exterior member 215. The projection portions 292 respectively project downward from opposite end portions of the base portion 291 in the longitudinal direction.

On the other hand, as shown in FIG. 4, FIG. 8, and FIG. 9, the bent portion 28C1 has through holes 28F. The through holes 28F are provided respectively in correspondence with the projection portions 292 of the locking portion 29. As shown in FIG. 4, FIG. 8, and FIG. 9, the projection portions 292 of the locking portion 29 are respectively inserted in the through holes 28F.

In addition, as shown in FIG. 6, FIG. 8, and FIG. 9, the first carriage 22 has opening portions 223. The opening portions 223 are provided in a left end portion of the first carriage 22, and are covered with the bent portion 28C1 when the first carriage 22 is at the start position P1. The opening portions 223 are provided respectively in correspondence with the projection portions 292 of the locking portion 29. As shown in FIG. 6 and FIG. 8, the projection portions 292 of the locking portion 29 are respectively inserted in the opening portions 223.

It is noted that the number of the projection portions 292 provided in the locking portion 29 may be one or three or more. When the number of the projection portions 292 is one or three or more, the through hole(s) 28F of the bent portion 28C1 and the opening portion(s) 223 of the first carriage 22 is (are) provided respectively in correspondence with the projection portion(s) 292.

In the image forming apparatus 10, when the magnet 7 is not disposed at the specific position P4 on the exterior member 215, the locking portion 29 is disposed at the first position P5, and the projection portions 292 of the locking portion 29 are inserted in the through holes 28F of the bent portion 28C1 and the opening portions 223 of the first carriage 22 (see FIG. 8). In this state, the bent portion 28C1 is engaged with the first carriage 22 disposed at the start position P1, and the movement of the first carriage 22 is locked.

In addition, in the image forming apparatus 10, when the magnet 7 is disposed at the specific position P4 on the exterior member 215, the locking portion 29 is magnetically attracted to the magnet 7, and moved from the first position P5 to the second position P6 (see FIG. 9). With this movement of the locking portion 29, the projection portions 292 of the locking portion 29 are pulled out from the opening portions 223 of the first carriage 22, and the engagement between the bent portion 28C1 and the first carriage 22 disposed at the start position P1 is released. Here, the locking portion 29 and the bent portion 28C1 of the frame 28 constitute an example of the lock mechanism of the present disclosure. In addition, the start position P1 is an example of the lock position of the present disclosure.

It is noted that the bent portion 28C1 may be provided independently of the frame 28 as far as it is supported by the housing 21.

For example, in the shipment of the image forming apparatus 10, the locking portion 29 is disposed at the first position P5. This allows the movement of the first carriage 22 to be restricted until the image forming apparatus 10 is transferred to under a use environment by the user. It is noted that with the restriction of the movement of the first carriage 22, the movement of the second carriage 23 that moves in conjunction with the movement of the first carriage 22 is also restricted.

In addition, in the image forming apparatus 10, after the image forming apparatus 10 is installed under a use environment by the user, the magnet 7 is disposed at the specific position P4 on the exterior member 215. With this arrangement, the locking portion 29 is moved from the first position P5 to the second position P6 by the magnetic force of the magnet 7, and the restriction on the movement of the first carriage 22 is released.

It is noted that all or a part of the exterior member 215 including the specific position P4 may be formed from a ferromagnetic body such as iron. In that case, the exterior member 215 and the magnet 7 magnetically attract each other, and it becomes difficult for the magnet 7 to be shifted from the specific position P4 during use of the image forming apparatus 10 by the user. In addition, a recessed portion may be formed at the specific position P4 on the exterior member 215 along the shape of the magnet 7, and all or a part of the magnet 7 in the up-down direction D1 may be stored in the recessed portion.

In addition, in the image forming apparatus 10, the magnet 7 is removed from the specific position P4 on the exterior member 215 when, for example, the image forming apparatus 10 is transferred due to relocation of the company office of the user. When the magnet 7 is removed, the locking portion 29 moves from the second position P6 to the first position P5 by its own weight so as to restrict the movement of the first carriage 22.

Here, in the image forming apparatus 10, when the magnet 7 is not present at the specific position P4 on the exterior member 215, the movement of the first carriage 22 is locked by the locking portion 29, and the operation to read an image from a document sheet is disturbed. In view of this, in the image forming apparatus 10, as shown in FIG. 2, a state detecting portion 51 and a notification processing portion 52 are provided in the control portion 5.

Specifically, the control portion 5 causes the CPU to execute the control programs stored in the ROM. This allows the control portion 5 to function as the state detecting portion 51 and the notification processing portion 52. It is noted that the state detecting portion 51 and the notification processing portion 52 may be composed of electronic circuits.

The state detecting portion 51 detects an abnormal state where the electric current supplied to the driving portion 26 has exceeded a predetermined set value. Here, the state detecting portion 51 is an example of the detecting portion of the present disclosure.

For example, in the image forming apparatus 10, the amount of driving current supplied from a power source (not shown) to the driving portion 26 is controlled by the feedback control. In addition, the image forming apparatus 10 includes a current detecting circuit (not shown) that detects the amount of driving current that flows from the power source to the driving portion 26. The state detecting portion 51 detects the abnormal state when the amount of driving current detected by the current detecting circuit exceeds the set value. For example, the set value is set to a value between: a value representing an amount of driving current that flows to the driving portion 26 when the driving portion 26 is driven while the movement of the first carriage 22 is not locked by the locking portion 29; and a value representing an amount of driving current that flows to the driving portion 26 when the driving portion 26 is driven while the movement of the first carriage 22 is locked by the locking portion 29.

When the state detecting portion 51 detects the abnormal state, the notification processing portion 52 notifies that the locking portion 29 is disposed at the first position P5. Here, the notification processing portion 52 is an example of the notifying portion of the present disclosure.

For example, the notification processing portion 52 displays on the operation/display portion 6 a message indicating that the locking portion 29 is disposed at the first position P5. In addition, the notification processing portion 52 may cause a predetermined light emitting portion provided on the operation/display portion 6 to emit light so as to indicate that the locking portion 29 is disposed at the first position P5. This allows the user to recognize that an operation failure of the image reading portion 2 has occurred due to absence of the magnet 7 at the specific position P4 on the exterior member 215.

As described above, in the image forming apparatus 10 according to the first embodiment of the present disclosure, the locking portion 29 is moved from the first position P5 to the second position P6 by the magnetic force of the magnet 7 disposed at the specific position P4 on the exterior member 215, wherein the locking portion 29 at the first position P5 engages the bent portion 28C1 with the first carriage 22, and the locking portion 29 at the second position P6 releases the engagement between the bent portion 28C1 and the first carriage 22. This makes it possible to simplify the configuration of the exterior member 215.

Second Embodiment

Figure 10:
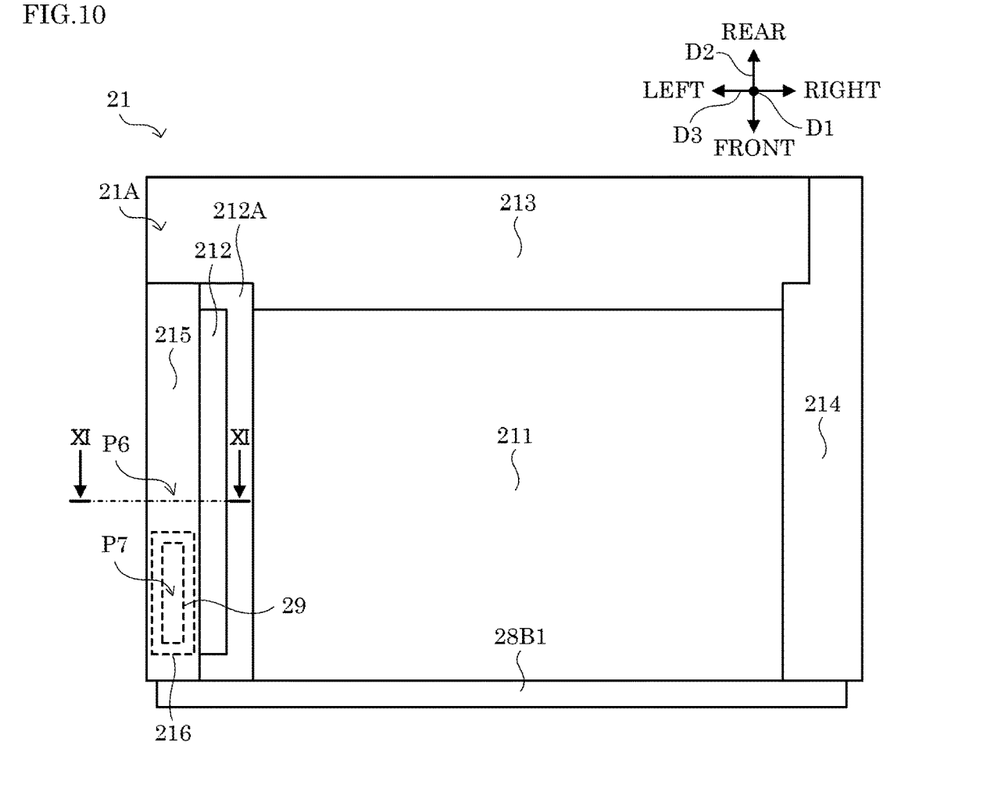
FIG. 10 is a diagram showing a third position of the locking portion in the image forming apparatus according to a second embodiment of the present disclosure.
Figure 11:
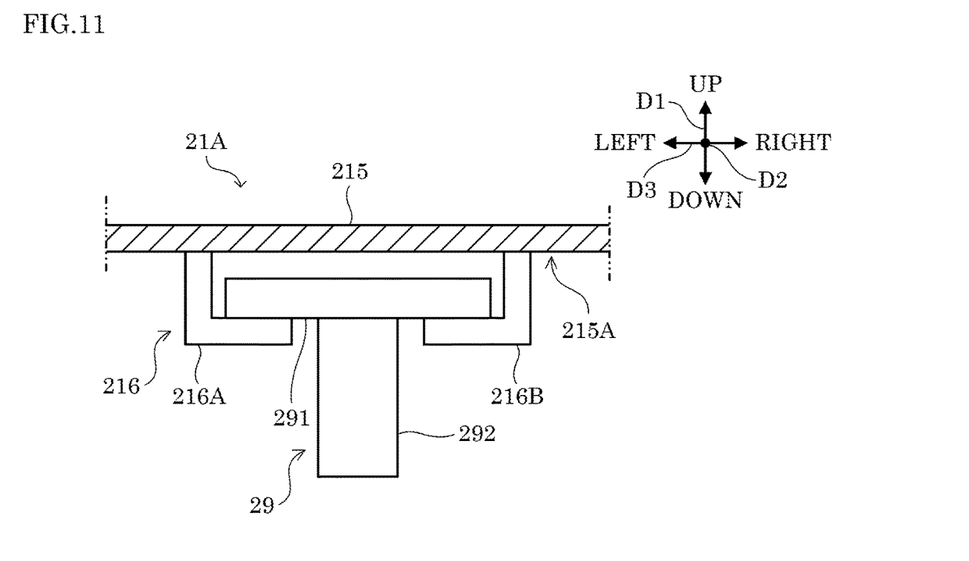
FIG. 11 is a diagram showing a configuration of a support portion in the image forming apparatus according to the second embodiment of the present disclosure.

Next, a description is given of a configuration of the image forming apparatus 10 according to a second embodiment of the present disclosure with reference to FIG. 10 and FIG. 11. Here, FIG. 10 is a plan view showing the upper surface 21A of the housing 21. In addition, FIG. 11 is a cross-sectional diagram taken along the XI-XI line and viewed from the direction of the arrows shown in FIG. 10.

The image forming apparatus 10 of the second embodiment differs from that of the first embodiment in that the exterior member 215 and the bent portion 28C1 are separated from each other by a distance that exceeds the length of the locking portion 29 in the up-down direction D1. That is, in the image forming apparatus 10 according to the second embodiment, when the locking portion 29 is disposed at the second position P6, projection ends of the projection portions 292 are positioned above the through holes 28F of the bent portion 28C1. With this configuration of the image forming apparatus 10 according to the second embodiment, the locking portion 29 can move in the horizontal direction as the magnet 7 moves in the horizontal direction from the specific position P4.

In addition, the image forming apparatus 10 of the second embodiment differs from that of the first embodiment in that a support portion 216 shown in FIG. 11 is provided on the exterior member 215. It is noted that the other points are common to the first embodiment and the second embodiment.

The support portion 216 supports the locking portion 29 at a third position P7 (see FIG. 10) that is separated from the second position P6 in the horizontal direction. Specifically, the third position P7 is separated from the second position P6 in a front direction. The support portion 216 is provided on a facing surface 215A (see FIG. 11) of the exterior member 215 that faces the locking portion 29.

As shown in FIG. 11, the support portion 216 includes a support piece 216A and a support piece 216B. The support piece 216A is formed to project downward from the exterior member 215 and project from the projection tip rightward to support the left end portion of the base portion 291 of the locking portion 29. The support piece 216B is formed to project downward from the exterior member 215 and project from the projection tip leftward to support the right end portion of the base portion 291. The support piece 216A and the support piece 216B extend in the front-rear direction D2.

The locking portion 29 moves from the second position P6 to the third position P7 in response to a movement of the magnet 7 from the specific position P4 in the horizontal direction. For example, a guide member (not shown) is provided on the facing surface 215A so as to guide the movement of the locking portion 29 from the second position P6 to the third position P7. The locking portion 29 is guided by the guide member to move from the second position P6 to the third position P7. The locking portion 29 is supported by the support portion 216 at the third position P7.

As described above, in the image forming apparatus 10 according to the second embodiment, the locking portion 29 is configured to move from the second position P6 to the third position P7 that are separated from each other in the horizontal direction. In addition, the locking portion 29 is supported by the support portion 216 at the third position P7. This configuration prevents the movement of the first carriage 22 from being restricted by the locking portion 29 when the magnet 7 is removed from the exterior member 215. As a result, it is possible to use the image forming apparatus 10 in a state where the magnet 7 has been removed from the exterior member 215.

Third Embodiment

Figure 12:
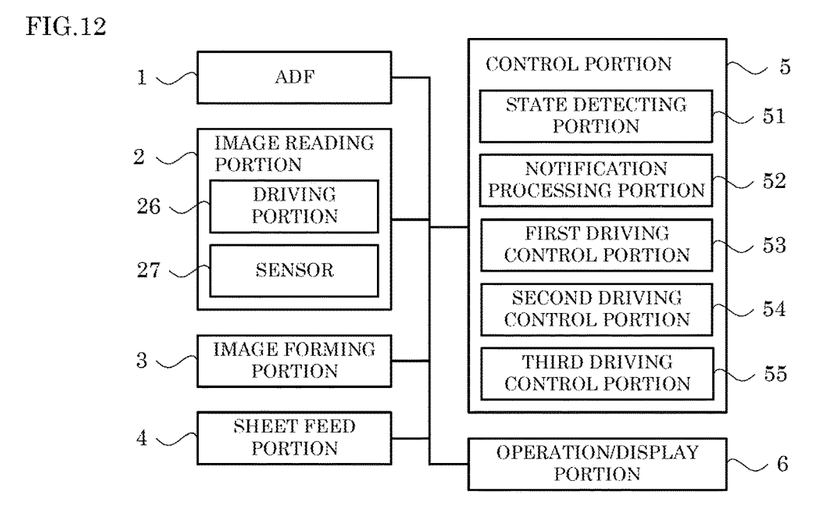
FIG. 12 is a block diagram showing a system configuration of the image forming apparatus according to a third embodiment of the present disclosure.
Figure 13:
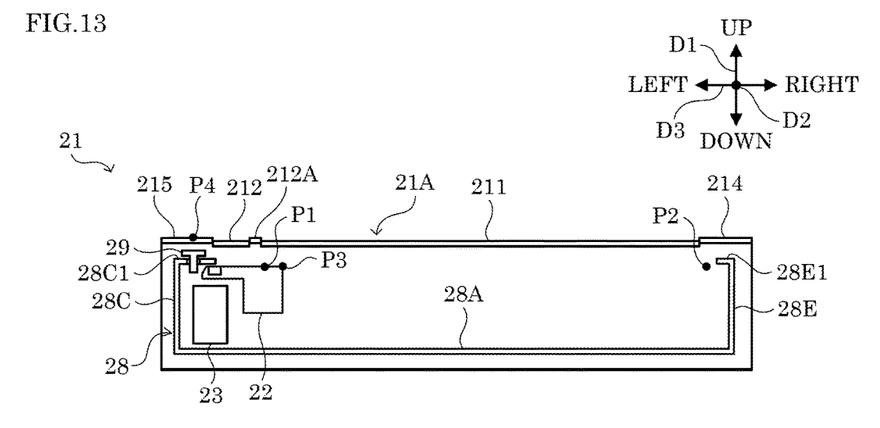
FIG. 13 is a diagram showing a movement range of the first carriage in the image forming apparatus according to the third embodiment of the present disclosure.
Figure 14:
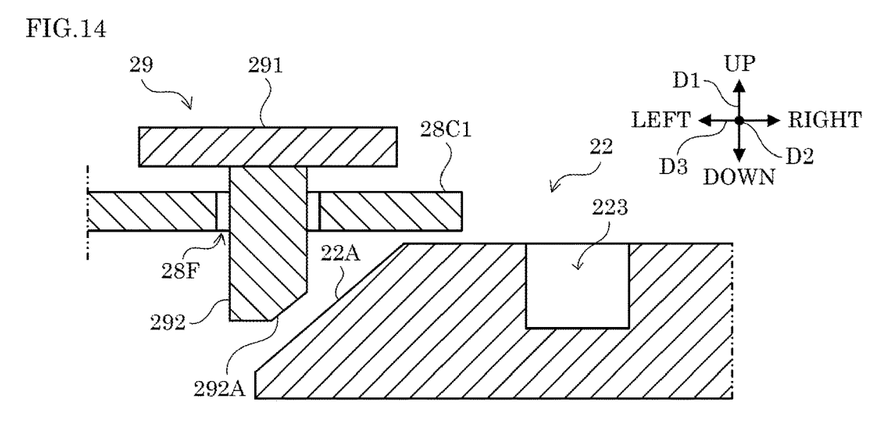
FIG. 14 is a diagram showing a configuration of the first carriage and the locking portion in the image forming apparatus according to the third embodiment of the present disclosure.

Next, a description is given of a configuration of the image forming apparatus 10 according to a third embodiment of the present disclosure with reference to FIG. 12 to FIG. 14. Here, FIG. 13 is a diagram showing a retreat position P3 of the first carriage 22. In addition, FIG. 14 is a schematic cross-sectional diagram showing the configuration of the first carriage 22 and the locking portion 29.

The image forming apparatus 10 according to the third embodiment differs from that of the first embodiment in the configuration of the first carriage 22, the locking portion 29, and the control portion 5. In addition, the image forming apparatus 10 according to the third embodiment differs from that of the first embodiment in the position where the sensor 27 is disposed. It is noted that the other points are common to the first embodiment and the third embodiment.

Specifically, the sensor 27 is provided at the retreat position P3 (see FIG. 13) which is, in the movement range of the first carriage 22, retreated from the start position P1 toward the end position P2. Here, the first carriage 22 at the retreat position P3 is separated from the projection portions 292 of the locking portion 29.

In addition, as shown in FIG. 14, the first carriage 22 includes an inclined surface 22A. The inclined surface 22A is formed on an end portion (a left end portion) of the first carriage 22 on the start position P1 side. As shown in FIG. 14, the inclined surface 22A is formed to be inclined downward from the opening portions 223 side toward the left end portion. When the first carriage 22 moves toward the start position P1, the inclined surface 22A comes into contact with projection end portions of the projection portions 292 of the locking portion 29 inserted in the through holes 28F of the bent portion 28C1, and pushes upward the locking portion 29. In the first carriage 22, the opening portions 223 are provided at a position closer to the end position P2 than the inclined surface 22A (provided on the right side).

In addition, as shown in FIG. 14, each of the projection portions 292 of the locking portion 29 includes an inclined surface 292A. The inclined surfaces 292A are provided at the right end portions of the projection end portions of the projection portions 292 that face the first carriage 22. The inclined surfaces 292A are formed to be inclined upward from the left end portions of the projection end portions toward the right end portions. With the provision of the inclined surfaces 292A on the projection portions 292, when the projection portions 292 come into contact with the inclined surface 22A of the first carriage 22, the locking portion 29 moves upward smoothly.

It is noted that the inclined surfaces 292A may not be provided on the projection portions 292 of the locking portion 29. In addition, the inclined surface 22A may not be provided on the first carriage 22. In this case, the inclined surfaces 292A of the projection portions 292 are formed such that the locking portion 29 can move upward when it comes into contact with the first carriage 22 moving toward the start position P1. In addition, both the inclined surfaces 292A and the inclined surface 22A may not be provided on the projection portions 292 of the locking portion 29 and the first carriage 22.

In addition, as shown in FIG. 12, the control portion 5 includes a first driving control portion 53, a second driving control portion 54, and a third driving control portion 55. Specifically, the control portion 5 causes the CPU to execute the control programs stored in the ROM. This allows the control portion 5 to function as the first driving control portion 53, the second driving control portion 54, and the third driving control portion 55. It is noted that the first driving control portion 53, the second driving control portion 54, and the third driving control portion 55 may be composed of electronic circuits.

The first driving control portion 53 causes the first carriage 22 to move from the start position P1 to the retreat position P3 (see FIG. 13). Here, the first driving control portion 53 is an example of the first control portion of the present disclosure.

For example, in the image forming apparatus 10, flag information is stored in a nonvolatile storage device (not shown) provided in the control portion 5, wherein the flag information indicates whether or not the first carriage 22 is present at the start position P1. When the flag information is first information that indicates that the first carriage 22 is present at the start position P1, the first driving control portion 53 moves the first carriage 22 from the start position P1 to the retreat position P3. In addition, after moving the first carriage 22 to the retreat position P3, the first driving control portion 53 rewrites the flag information from the first information to second information that indicates that the first carriage 22 is not present at the start position P1.

For example, each time a predetermined determination timing comes, the first driving control portion 53 determines, based on the flag information, whether or not to control the driving of the first carriage 22. For example, the predetermined determination timing is when the image forming apparatus 10 is powered on, when the image forming apparatus 10 returns from a sleep state in which its partial functions are stopped, to a normal state, or when a reading process of reading image data from a document sheet placed on the first contact glass 211 is executed.

It is noted that when the flag information is the first information, the first driving control portion 53 may display, on the operation/display portion 6, a message that urges to dispose the magnet 7 to the specific position P4. In that case, the first driving control portion 53 may move the first carriage 22 in accordance with a user operation received after the display of the message.

The third driving control portion 55 moves the first carriage 22 to the start position P1 in response to a user operation. Here, the third driving control portion 55 is an example of the third control portion of the present disclosure.

For example, the third driving control portion 55 moves the first carriage 22 from the retreat position P3 to the start position P1 in a case where the flag information is the second information, and a user operation instructing to move the first carriage 22 to the start position P1 is received. In addition, after moving the first carriage 22 to the start position P1, the third driving control portion 55 rewrites the flag information from the second information to the first information. This enables the user to lock the movement of the first carriage 22 in the housing 21 in a case where the image forming apparatus 10 that has been installed under a use environment, needs to be transferred again.

Here, in the image forming apparatus 10 according to the third embodiment, as the first carriage 22 is moved from the retreat position P3 to the start position P1, the locking portion 29 is pushed upward by the inclined surface 22A of the first carriage 22 so as to be inserted in the opening portions 223. As a result, in the image forming apparatus 10 according to the third embodiment, the user does not need to use the magnet 7 to lift the locking portion 29 from the first position P5 to the second position P6 so as to lock the movement of the first carriage 22.

The second driving control portion 54 moves the first carriage 22 in a range from the retreat position P3 to the end position P2 each time a predetermined driving timing comes after the first driving control portion 53 moves the first carriage 22 to the retreat position P3. Here, the second driving control portion 54 is an example of the second control portion of the present disclosure.

Specifically, during a period after the first carriage 22 is moved to the retreat position P3 by the first driving control portion 53 until the first carriage 22 is moved to the start position P1 by the third driving control portion 55, the second driving control portion 54 moves the first carriage 22 in the range from the retreat position P3 to the end position P2 each time the predetermined driving timing comes. For example, the second driving control portion 54 moves the first carriage 22 in the range from the retreat position P3 to the end position P2 in a case where the driving timing has come and the flag information is the second information.

For example, the driving timing is when the reading process is executed. In addition, the driving timing may be when pre-scanning of a document sheet placed on the first contact glass 211 is executed.

It is noted that in a case where the driving timing has come and the flag information is the first information, the first driving control portion 53 moves the first carriage 22 to the retreat position P3 and rewrites the flag information to the second information. After the first driving control portion 53 rewrites the flag information, the second driving control portion 54 moves the first carriage 22 in the range from the retreat position P3 to the end position P2.

As described above, in the image forming apparatus 10 according to the third embodiment, the first carriage 22 is moved in the range from the retreat position P3 to the end position P2 when the driving timing comes. As a result, the movement of the first carriage 22 is not prevented by the locking portion 29 even when the magnet 7 has been removed from the exterior member 215 and the locking portion 29 is disposed at the first position P5.

It is noted that in the image forming apparatus 10 according to the third embodiment, the third driving control portion 55 may not be provided in the control portion 5.

Fourth Embodiment

Figure 15:
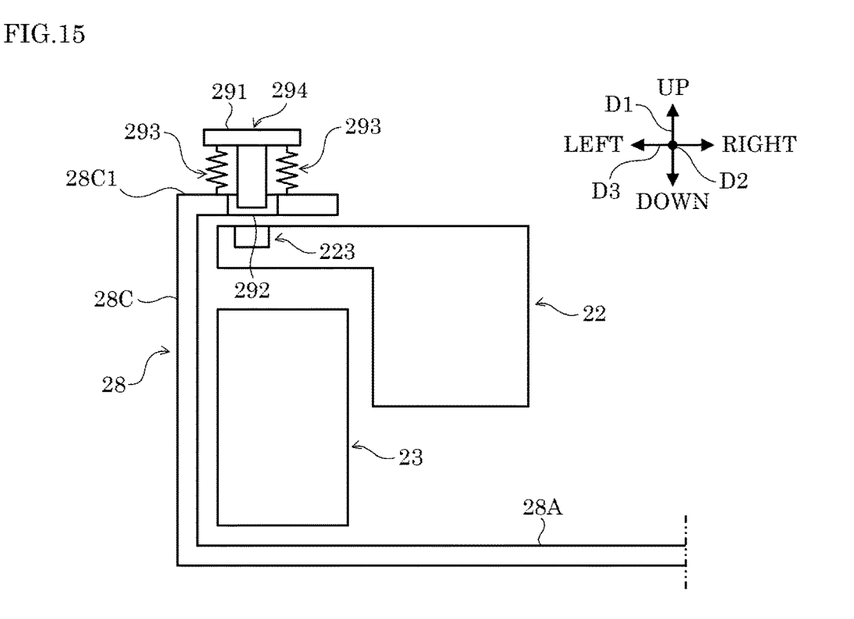
FIG. 15 is a diagram showing a configuration of the locking portion in the image forming apparatus according to a fourth embodiment of the present disclosure.
Figure 16:
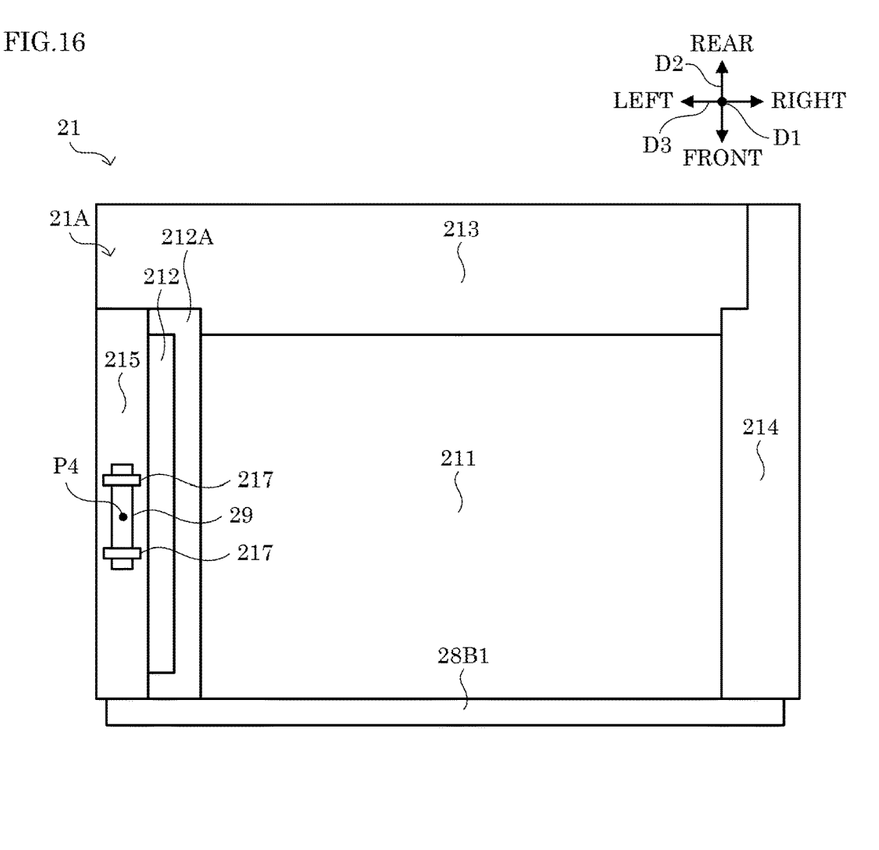
FIG. 16 is a diagram showing a configuration of a movement restricting portion in the image forming apparatus according to the fourth embodiment of the present disclosure.

In the following, a description is given of the image forming apparatus 10 according to a fourth embodiment of the present disclosure with reference to FIG. 15 and FIG. 16. Here, FIG. 15 is a diagram showing a configuration of the locking portion 29. FIG. 16 is a plan view showing the upper surface 21A of the housing 21.

The image forming apparatus 10 according to the fourth embodiment differs from that of the first embodiment in the configuration of the locking portion 29 and the exterior member 215. It is noted that the other points are common to the first embodiment and the fourth embodiment.

Specifically, as shown in FIG. 15, the locking portion 29 includes biasing portions 293. The biasing portions 293 bias the locking portion 29 in a direction from the first position P5 toward the second position P6. For example, each of the biasing portions 293 is a compression coil spring whose one end is fixed to the upper surface of the bent portion 28C1 and the other end is fixed to the base portion 291 of the locking portion 29.

In addition, the base portion 291 of the locking portion 29 includes a magnetic pole 294. Specifically, the base portion 291 of the locking portion 29 is formed from a magnet. The polarity of the magnetic pole 294 may be the N pole or the S pole.

The locking portion 29 is moved from the second position P6 to the first position P5 by a magnetic repulsive force generated between the locking portion 29 and the magnet 7. Specifically, the locking portion 29 is moved from the second position P6 to the first position P5 by a magnetic repulsive force that is generated between the locking portion 29 and the magnet 7 when the magnet 7 is disposed at the specific position P4 in a state where the same polarity as that of the magnetic pole 294 is oriented toward the exterior member 215. In addition, when the magnet 7 is removed from the specific position P4, the locking portion 29 is moved from the first position P5 to the second position P6 by the biasing force of the biasing portions 293.

In addition, as shown in FIG. 16, the exterior member 215 includes movement restricting portions 217. The movement restricting portions 217 restrict the magnet 7 from being moved by the magnetic repulsive force generated between the locking portion 29 and the magnet 7. For example, the movement restricting portions 217 are formed in the shape of an arch so as to come into contact with the upper surface and the side surfaces of the magnet 7 disposed at the specific position P4. It is noted that the exterior member 215 may have a recessed portion in which the magnet 7 can be stored, and the movement restricting portion 217 may be configured to come into contact with the upper surface of the magnet 7 stored in the recess portion. Here, the movement restricting portions 217 constitute an example of the restricting portion of the present disclosure.

As described above, in the image forming apparatus 10 according to the fourth embodiment, the movement of the first carriage 22 is locked in a case where the magnet 7 is disposed at the specific position P4 on the exterior member 215. As a result, the movement of the first carriage 22 is not prevented by the locking portion 29 in a state where the magnet 7 has been removed from the exterior member 215.

It is noted that in the image forming apparatus 10 according to the fourth embodiment, the specific position P4 may be a position on an outer surface of the housing 21 that is different from the upper surface 21A. In addition, the locking portion 29 may engage the frame 28 with the second carriage 23.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
a housing including an exterior member and a document sheet placement surface on which a document sheet is placed, the exterior member forming an outer surface of the image reading device;
a carriage configured to move in the housing along a predetermined specific direction, wherein either or both of a light source and a mirror that are used to read an image from the document sheet placed on the document sheet placement surface, are attached to the carriage; and
a lock mechanism configured to lock the carriage to a predetermined lock position within a movement range of the carriage, wherein
the lock mechanism includes:
a supported portion supported by the housing and provided between the exterior member and the carriage disposed at the lock position; and
a locking portion configured to move from either of a first position and a second position to the other so as to, at the first position, engage the supported portion with the carriage disposed at the lock position, and at the second position, release engagement between the supported portion and the carriage, the second position being closer to the exterior member than the first position, the locking portion moving from either of the first position and the second position to the other in response to a magnetic force of a magnet that is disposed at a specific position on the exterior member in a state of facing the supported portion across the exterior member.

2. The image reading device according to claim 1, wherein
the exterior member forms an upper surface of the image reading device,
the second position is separated from the first position in an upward direction, and
the locking portion is moved from the first position to the second position by being magnetically attracted to the magnet.

3. The image reading device according to claim 2, wherein
the exterior member includes a support portion supporting the locking portion at a third position that is separated from the second position in a horizontal direction, and
the locking portion moves from the second position to the third position in response to a movement of the magnet from the specific position in the horizontal direction.

4. The image reading device according to claim 2, wherein
the lock position is a start position in the movement range, and
the image reading device further comprises:
a first control portion configured to move the carriage from the lock position to a retreat position that is, in the movement range, retreated toward an end position; and
a second control portion configured to move the carriage in a range from the retreat position to the end position each time a predetermined driving timing comes after the first control portion moves the carriage to the retreat position.

5. The image reading device according to claim 4, further comprising:
a third control portion configured to move the carriage to the lock position in response to a user operation, wherein
during a period after the carriage is moved to the retreat position by the first control portion until the carriage is moved to the lock position by the third control portion, the second control portion moves the carriage in the range from the retreat position to the end position each time the predetermined driving timing comes.

6. The image reading device according to claim 5, wherein
the locking portion includes a projection portion projecting downward,
the supported portion includes a through hole in which the projection portion is inserted, and
the carriage includes an inclined surface and an opening portion, the inclined surface being formed on an end portion of the carriage on a side of the lock position, and when the carriage moves toward the lock position, coming into contact with a projection end portion of the projection portion inserted in the through hole and pushing upward the locking portion, the opening portion being provided such that the projection portion is inserted in the opening portion at a position closer to the end position than the inclined surface.

7. The image reading device according to claim 2, further comprising:
a driving portion configured to, upon supply of electric current, supply a driving force to the carriage;
a detecting portion configured to detect an abnormal state where the electric current supplied to the driving portion has exceeded a predetermined set value; and
a notifying portion configured to, when the detecting portion has detected the abnormal state, notify that the locking portion is disposed at the first position.

8. The image reading device according to claim 1, further comprising:
a biasing portion configured to bias the locking portion in a direction from the first position toward the second position, wherein
the locking portion includes a magnetic pole, and is moved from the second position to the first position by a magnetic repulsive force generated between the locking portion and the magnet.

9. The image reading device according to claim 8, wherein
the exterior member includes:
a restricting portion configured to restrict the magnet from being moved by the magnetic repulsive force.

10. An image forming apparatus comprising:
the image reading device according to claim 1; and
an image forming portion configured to form an image based on image data read by the image reading device.

11. A locking member provided in an image reading device that includes: a housing including an exterior member and a document sheet placement surface on which a document sheet is placed, the exterior member forming an outer surface of the image reading device; a carriage configured to move in the housing along a predetermined specific direction, wherein either or both of a light source and a mirror that are used to read an image from the document sheet placed on the document sheet placement surface, are attached to the carriage; and a supported portion supported by the housing and provided between the exterior member and the carriage disposed at a predetermined lock position within a movement range of the carriage, wherein
the locking member moves from either of a first position and a second position to the other so as to, at the first position, engage the supported portion with the carriage disposed at the lock position, and at the second position, release engagement between the supported portion and the carriage, the second position being closer to the exterior member than the first position, the locking member moving from either of the first position and the second position to the other in response to a magnetic force of a magnet that is disposed at a specific position on the exterior member in a state of facing the supported portion across the exterior member.

* * * * *